United States Patent [19]
Sones et al.

[11] 3,931,623
[45] Jan. 6, 1976

[54] RELIABLE EARTH TERMINAL FOR SATELLITE COMMUNICATIONS

[75] Inventors: William K. Sones, Ellicott City; Laurence F. Gray, Bethesda; Louis Pollack, Rockville, all of Md.

[73] Assignee: Communications Satellite Corporation, Washington, D.C.

[22] Filed: May 31, 1974

[21] Appl. No.: 475,228

[52] U.S. Cl. .................... 343/225; 325/1; 325/15; 330/4.5; 330/16; 330/53
[51] Int. Cl. ............................................. H04b 7/14
[58] Field of Search ............ 325/1, 2, 3, 4, 5, 8, 14, 325/15; 343/175, 176

[56] References Cited
UNITED STATES PATENTS
| | | | |
|---|---|---|---|
| 3,456,191 | 7/1969 | Rodenburg et al. | 325/2 |
| 3,519,945 | 7/1970 | Lawson et al. | 325/2 |

OTHER PUBLICATIONS
Aspesi et al., Communication Apparatus of the Earth Station for Transmission Via Satellites, Alta Frequenza (Italy), Vol. 39, No. 12, (Dec. 1970).

Primary Examiner—George H. Libman
Attorney, Agent, or Firm—Sughrue, Rothwell, Mion, Zinn & Macpeak

[57] ABSTRACT

A reliable earth terminal for satellite communications systems capable of unattended operation for extended periods of time is disclosed. The terminal includes an antenna with a single fixed reflector which can provide multiple beams, each of which can be positioned by small feed motion. The transmitter is of a modular construction, using a relatively low power traveling wave tube power amplifier for each increment in the operating band. The transmitting chains are designed to carry voice, data, or television signals to a satellite and include a modulator, IF amplifier, band-limiting filter, frequency converter, and power amplifier. Each amplifier is capable of operating over the full operating band; however, operation of each amplifier is limited to an assigned increment through the use of band-limiting filters. A single, redundant high power amplifier is provided and may be remotely switched into any one of the transmitting chains in the event of a failure. Amplifier outputs are connected to the antenna through a directional filter multiplexer. The receiver includes a low noise preamplifier featuring modular, "fail-soft" design. The receiving chains following the low noise preamplifier are channelized into band increments corresponding to those of the transmitting chains with separate converter and demodulator modules for each carrier. All subsystems are broadband, and channel bandwidth is determined only by intermediate frequency band pass filters. Prime power is low voltage battery banks constantly recharged by a commercial power source. The terminal can be operated for a limited period of time solely on the battery bands during commercial outages. A back-up motor generator provides recharging power during extended periods of commercial outages. The terminal is monitored and controlled from a central control point. Since the terminal is both automatic and self-protecting, remote control is limited to parameter adjustments required for normal operation, such as antenna feed positioning, changes in transmitter power, and switching to the spare power amplifier or turning off any carrier.

8 Claims, 2 Drawing Figures

RELIABLE EARTH TERMINAL FOR SATELLITE COMMUNICATIONS

BACKGROUND OF THE INVENTION

1. Field of the Invention

The present invention generally relates to satellite communications systems, and more particularly to an earth terminal for such systems which is sufficiently reliable and so configured that unattended operation for extended periods of time is possible.

2. Description of the Prior Art

Communication satellite earth terminals have evolved from the experimental-operational designs of the early 1960's to wideband commercial designs in present use. These terminals have been supplied by a number of commercial sources to meet the transmission performance required by the expanding system demands. They have been built to commercial engineering standards, and though long life has been specified, reliability has not been emphasized.

The existing international satellite communications network is currently designed as a system of trunk links using large earth terminals needing considerable on-site manpower. The typical earth terminal is operated by an average of 30 people. The next stage of this evolving industry is the development of domestic and regional systems in which the number of earth terminals is greatly expanded. When the growing and changing needs of these systems are examined, it becomes apparent that there is a need for a reliable earth terminal designed to permit unattended operation.

Presently, satellite communications earth terminals incorporate certain design features which mitigate against reliability and unattended operation. Among these are autotracking antennas with rapid motion and complete sky coverage. Such antennas typically consist of a parabolic shaped reflector Cassegrain-fed antenna with tracking feed mounted on a servo-driven pedestal and a tracking receiver. The choice of this type of antenna has been dictated in the past by large variation in satellite station-keeping and the need to point to alternate satellites spaced at significant angles to provide for communication reliability and avoid sun outages.

Because of low noise requirements in satellite communications systems, cryogenically cooled parametric amplifiers are usually used as preamplifiers in earth terminal receivers. Such amplifiers are highly complicated requiring refrigerators, dewars, switches, and additional monitoring equipment. Reliability of the cryogenic parametric amplifiers is relatively low due primarily to the refrigerator, and failure is usually catastrophic resulting in long outages. Failure of a cooled stage or a refrigerator failure could be overcome by switching to a redundant unit. However, since both units would have been running continuously since the last maintenance, the probability of survival of one of the two is not greatly enhanced.

Current systems employ a transmitter using a single high-powered wideband amplifier covering the entire band of operation. While this type of transmitter has the advantage of simplicity and low cost, it suffers significant disadvantages. First of all, the power output of the amplifier must be equal to the largest requirement of the combined aggregate of the channels of the particular earth terminal. This necessitates large high voltage power supplies and water cooling. Second, the intermodulation and crosstalk levels imposed by communication requirements presently require the high-power tube to be operated with an output backoff of approximately 7 dB. Furthermore, with additional increases in channel capacity per carrier, crosstalk dominates resulting in the requirement for an even higher powered amplifier.

SUMMARY OF THE INVENTION

It is therefore an object of the present invention to provide an earth terminal for satellite communications which is capable of uninterrupted transmission for extended periods of time and wherein repairs or replacements of subsystems may be made without transmission interruption.

It is another object of the invention to provide a reliable earth terminal for unattended operation in satellite communications systems wherein redundant subsystems and prime power back-up are automatically brought into operation and only minimal operational control and status supervision need be accomplished from a regional center.

It is a further object of the invention to provide a reliable earth terminal for satellite communications capable of unattended operation for extended periods of time wherein the basic subsystems can accommodate a range of traffic requirements without change and which can be easily expanded to accommodate additional channels as required.

It is a further object of the invention to provide a reliable earth terminal for satellite communications wherein the basic RF, IF and local oscillator subsystems are broadband (500 MHZ) fixed tuned circuits which can be assigned to any channel or group of channels by appropriate passive filters and crystal selection in the local oscillator.

According to the present invention, the foregoing and other objects are attained by providing an earth terminal for satellite communications, including an antenna having a fixed, non-rectangular torus reflector together with a feed system capable of multiple beam formation and limited steering. A separate, medium power amplifier is provided for each segment of the transmission band. The power amplifier outputs are combined into a single feed using a directional filter type of multiplexer to which additional sections can be added as required. Switching is arranged so that a spare power amplifier can replace any failed unit by operating two switches in one step. The low noise reciever includes an uncooled, modular parametric amplifier with excess gain such that failure of any one section results in only minor degradation in the receiver noise figure. The modular construction of the parametric amplifier permits replacement of any section without interruption of operation. A broadband microwave transistor amplifier featuring microwave integrated circuitry and parallel redundant, construction follows the low noise parametric amplifier. A wideband down-converter and local oscillator is provided for each carrier allowing for convenient expansion and greater commonality of subsystems and testing. The subsystems that do not employ fail soft redundency, e.g., the local oscillator and modulator or demodulator, are redundant and incorporate internal switching in order to obtain maximum reliability. A control processor is provided to take status information from each subsystem, perform some elementary switching decisions, and transmit a complete set of performance data to a regional or central monitoring and control facility. The entire terminal operates on storage batteries constantly recharged by commercial power with a motor generator back-up in case of extended commercial power failure.

BRIEF DESCRIPTION OF THE DRAWINGS

The specific nature of the invention, as well as other objects, aspects, uses and advantages thereof, will clearly appear from the following description and from the following drawings, in which.

DESCRIPTION OF THE PREFERRED EMBODIMENT

Figure 1:
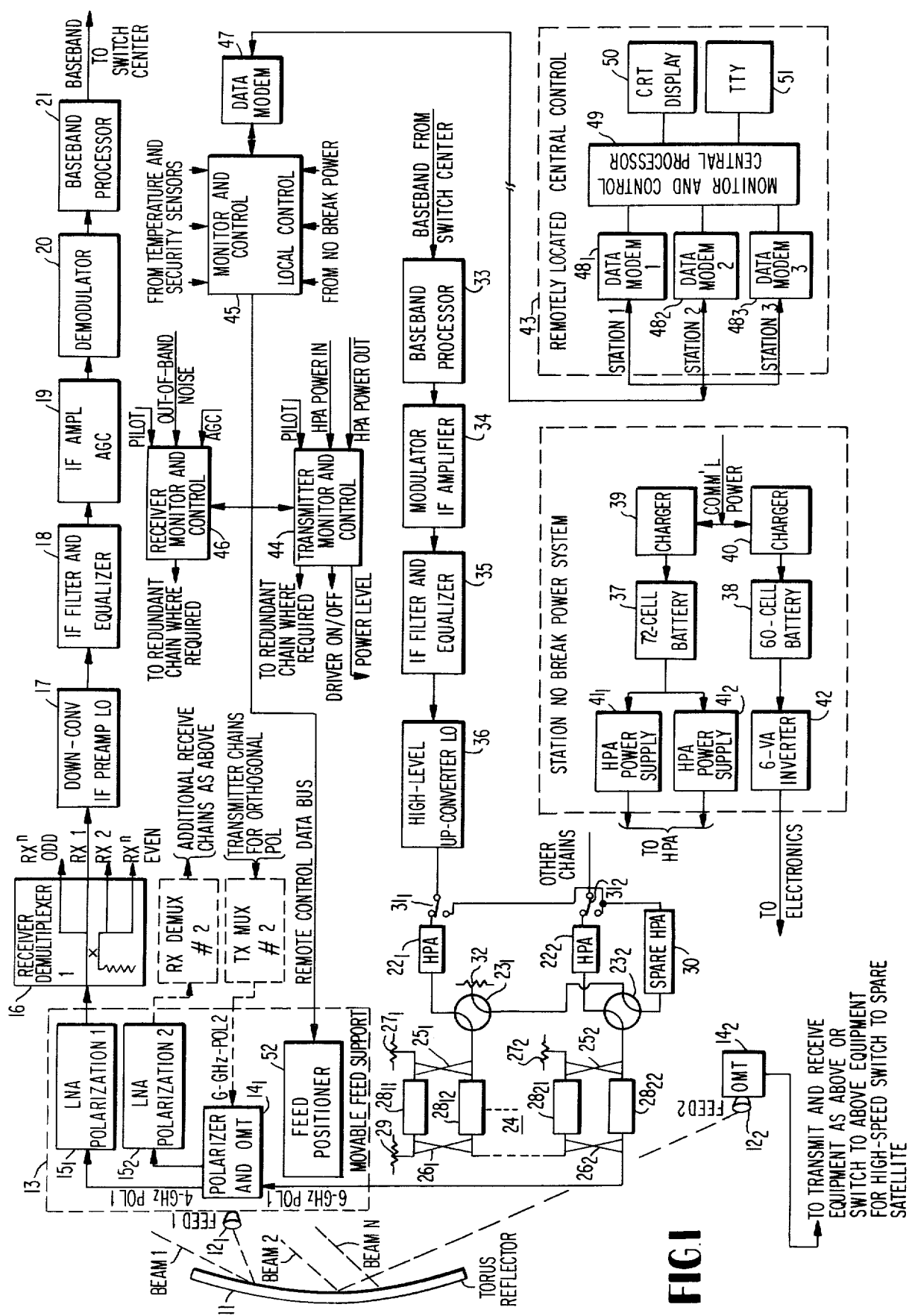
FIG. 1 is a system block diagram of the reliable earth terminal according to the invention.

Referring now to the drawings, and more particularly to FIG. 1, the reliable earth terminal according to the invention is intended for use in a network of many earth terminals, perhaps 400 to 500, each operating with two or more satellites spaced 3° to 5° apart. To this end, a fixed-non-rectangular torus reflector 11 is provided to reflect energy from a plurality of hornfeeds $12_1$ and $12_2$ toward respective satellites, or to reflect received energy from those satellites to the corresponding feeds $12_1$ and $12_2$. The surface of the reflector 11 is generated by a parabolic arc rotated about an axis appropriately oriented at the earth site to obtain uniform scanning of the geosynchronous arc. This type of surface yields higher efficiency than a spherical reflector, though somewhat less flexibility in out-of-plane scan. The feeds $12_1$ and $12_2$ are positioned along an arc matching the reflector paraxial arc and at a optimum distance from the reflector located between the paraxial and the parabolic focal arcs. Beam steering in equivalent hour angle motion is accomplished simply by sliding a carriage, supporting the feed assembly 13, along a pair of bearing rods (not shown) formed to match the feed arc mentioned above. The required declination motion, to follow out-of-plane satellite drift, is guided by a pair of parallel rods (not shown) in a plane perpendicular to the first set of rods. A more detailed description of the antenna may be had by reference to copending application Ser. No. 311,984 now U.S. Pat. No. 3,852,763, Dec. 3, 1974 by Kreutel and Hyde for "Torus-Type Antenna Having a Conical Scan Capability" and assigned to a common assignee.

Each of the horn feeds $12_1$ and $12_2$ is connected to a polarizer (for circular polarization transmission) and orthomode transducer $14_1$ and $14_2$. With linear polarization, the polarizer is omitted. Since the transmit and receive equipment for each beam is identical, only the transmit and receive equipment associated with the horn feed $12_1$ will be described in detail. Transmission and reception on each beam is in two orthogonal polarizations. Thus, the polarizer and orthomode transducer $14_1$ provides two outputs to low noise amplifiers $15_1$ and $15_2$ for each of the two polarizations. The receiving chain for each polarization is identical, and therefore, only the receiving chain associated with the low noise amplifier $15_1$ will be described in detail.

Figure 2:
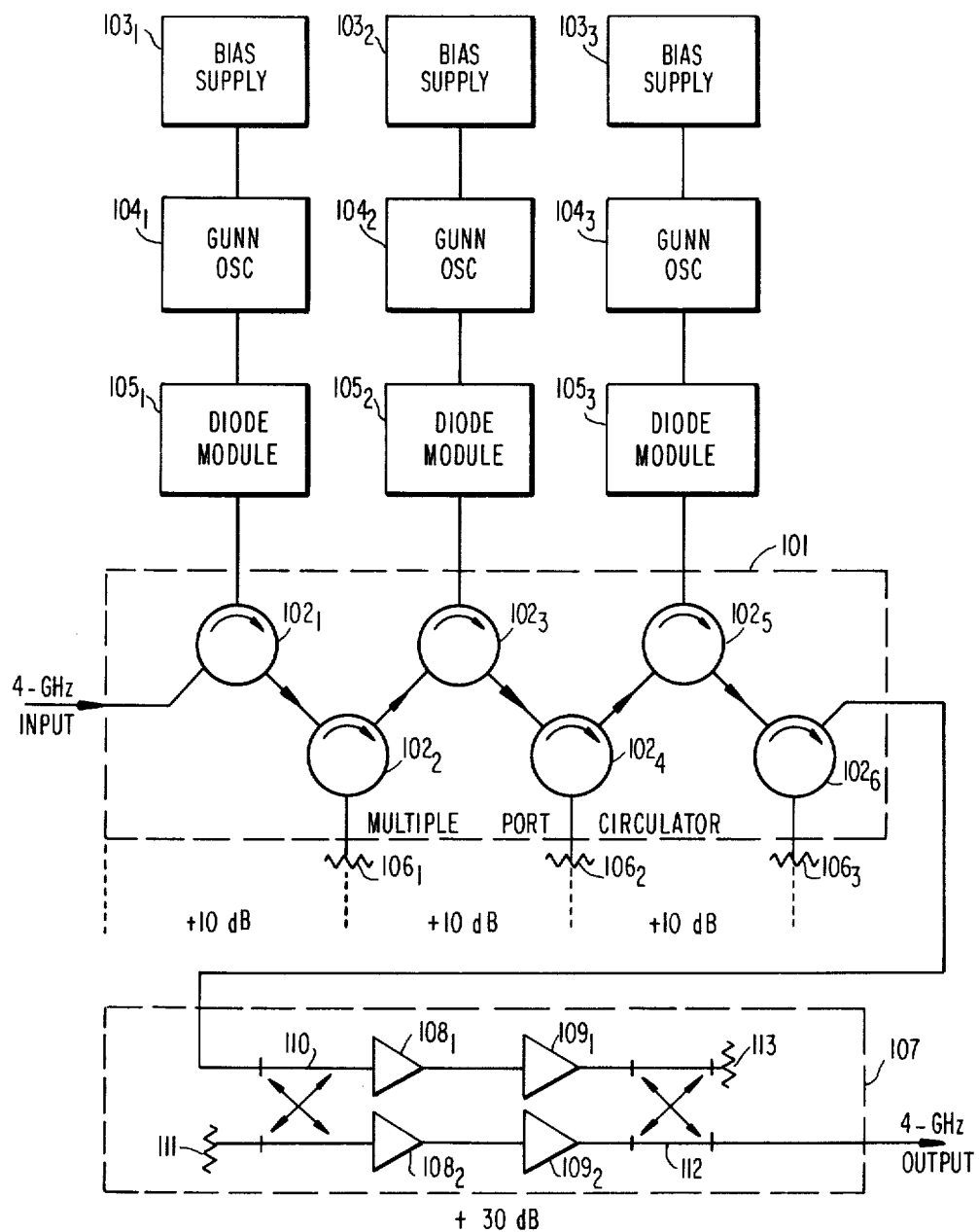
FIG. 2 is a block diagram of the low noise amplifier used in the system shown in FIG. 1.

Referring to FIG. 2 of the drawings, the low noise amplifiers $15_1$ and $15_2$ take the form of a three stage parametric amplifier followed by a four stage transistor amplifier. More particularly, the parametric amplifier includes a multiple port circulator 101 comprising six three-port-stripline circulators $102_1$ to $102_6$ connected in cascade in a integrated assembly. The output from the polarizer and orthomode transducer $14_1$ is connected to one arm of the circulator $102_1$. The next succeeding arm of circulator $102_1$ is connected to a parametric amplifier module comprising a separate bias supply $103_1$, a GUNN diode oscillator $104_1$ and a varactor diode module $105_1$. The amplifier signal from the first parametric amplifier module is circulated to the third port of circulator $102_1$ which is connected to one of the ports of circulator $102_2$. The signal is then coupled from the next port of circulator $102_2$ to one of the ports of circulator $102_3$. The third port of circulator $102_2$ is terminated in the characteristic impedance $106_1$ of the circulator to prevent any reflection of energy. Thus, circulator $102_2$ provides isolation between circulators $102_1$ and $102_3$.

A second parametric amplifier module identical to the first and comprising a biasupply $103_2$, a GUNN diode oscillator $104_2$ and a varactor diode module $105_2$ is connected to the second port of circulator $102_3$. This construction is repeated for a third stage of the parametric amplifier, each stage being isolated from preceding and/or succeeding stages by circulators $102_2$, $102_4$ and $102_6$. Each amplifier module has identical broadband response, so that a module can replace any other module.

The output of the parametric amplifier taken at the second port of circulator $102_6$ is connected to a microwave transistor amplifier 107. This amplifier comprises two parallel redundant cascaded amplifiers $108_1$, $109_1$ and $108_2$, $109_2$. The input to transistor amplifier 107 is connected to one port of a four port hybrid junction 110. The other input port of junction 110 is terminated in its characteristic impedance 111. The two output ports of the hybrid junction 110 are connected to the inputs of amplifiers $108_1$ and $108_2$. In like manner, the outputs of amplifiers $109_1$ and $109_2$ are connected to the two input ports of a second four port hybrid junction 112. One output port of the hybrid junction 112 is taken as the output of amplifier 107, while the other output port is terminated in the characteristic impedance 113 of the hybrid junction.

Reliability in the low noise amplifier is achieved in two ways. First, in the event of a parametric amplifier stage failure, the signal is simply circulated to the next stage, and the gain loss is automatically compensated by the IF amplifier automatic gain control. The greatest degradation occurs when the first parametric amplifier stage fails, and this amounts to a maximum of 1½ dB noise temperature degradation. A correspondingly lower degradation occurs if either the second or third stages fail. The reliability achieved by this construction may be described as "fail-soft" since the failure of any one parametric amplifier module results in only a slight degradation of the output signal. The second form of reliability results from the redundant construction of the transistor amplifier 107. If a failure occurs in either of the cascaded amplifier pairs $108_1$, $109_1$ or $108_2$, $109_2$, the remaining cascaded pair will continue to provide an amplified output signal, with only 6 db loss of gain. The gain loss in the parametric amplifier and transistor amplifier is compensated by the AGC action of the IF Amp AGC module 19 (FIG. 1).

Return to FIG. 1, the output of the low noise amplifier $15_1$ is connected to a receiver demultiplexer 16. The receiver demultiplexer 16 is preferably a stripline filter-demultiplexer providing as many outputs as there are assigned channels. Each output is connected to a separate receiving chain typically comprising a down converter and IF preamp 17, and IF filter and equalizer 18, an IF amplifier with automatic gain control 19, a demodulator 20, and a base band processor 21. The output of the base band processor 21 is connected to a switch center.

The transmitting chain for one polarization will now be described, it being understood that a second, identical transmitting chain is provided for the second, orthogonal polarization. In order to avoid the problems associated with high-power, liquid-cooled amplifiers usually employed for multicarrier operation, the reliable earth terminal uses separate high-power amplifiers $22_1$ and $22_2$ for each carrier. This permits each amplifier to operate at or close to saturation with maximum efficiency without the limitations imposed by crosstalk and intermodulation that would be characteristic of multi-carrier operation. In addition, amplifiers $22_1$ and $22_2$ are relatively low powered amplifiers compared to that which would be required for a single amplifier multi-carrier operation. This makes feasible the use of a longlife, air-cooled, high-gain traveling wave tube amplifier for each of amplifiers $22_1$ and $22_2$. Each of these amplifiers is capable of operating over the full communications band, typically ±250 MHz centered at 6.175 GHZ, however, operation of each amplifier is limited to smaller increments of the band, on the order of 40 MHz, centered at its respective assigned carrier frequency, corresponding to the satellite channel assignments, as will be explained in more detail in the following description.

The outputs of the high powered amplifiers $22_1$ and $22_2$ are connected by means of microwave switches $23_1$ and $23_2$ to a directional filter multiplexer 24. The microwave switches $23_1$ and $23_2$ comprise an output crossbar switch matrix and are each typically two-position waveguide transfer switches of known design and function. The multiplexer 24 is modular in construction, and each module comprises an input hybrid junction $25_1$ and a $25_2$ and an output hybrid junction $26_1$ and $26_2$. One input port of each of the input hybrid junctions $25_1$ and $25_2$ is connected by way of the microwave switches $23_1$ and $23_2$ to the corresponding high powered amplifiers $22_1$ and $22_2$. The other input port of each of the input hybrid junctions $25_1$ and $25_2$ is terminated in the characteristic impedance $27_1$ and $27_2$. Connected between the output ports of hybrid junctions $25_1$ and $25_2$ and the input ports of hybrid junctions $26_1$ and $26_2$ are bandpass filter pairs $28_{11}$, $28_{12}$ and $28_{21}$, $28_{22}$. Each of the bandpass filters $28_{11}$, $28_{12}$, $28_{21}$ and $28_{22}$ preferably takes the form of the plural cavity bandpass waveguide filter described in the U.S. Pat. No. 3,679,898, issued to Blachier and Champeau. The output ports of hybrid junctions $26_1$ to $26_2$ are connected in series with one of the output ports of the first hybrid junction $26_1$ being terminated in its characteristic impedance 29 and one of the output ports of the last hybrid junction $26_2$ being connected to one of the two inputs of the polarizer and orthomode transducer $14_1$. Since the multiplexer 24 is modular in construction and each of the modules are isolated, additional modules can be added or deleted from the multiplexer assembly as needed with no design changes and limited or no interruption in service.

Reliability of the transmitter is provided by a single redundant high-power amplifier 30. The use of a single redundant amplifier is possible by virtue of the fact that each high-power amplifier is broadband and capable of operating over the full communications band. Therefore, all amplifiers are identical and may be replaced by the single redundant amplifier 30. Substitution of the redundant amplifier 30 for any one of the amplifiers $22_1$ and $22_2$ is accomplished through switching. Each of the amplifiers $22_1$ and $22_2$ has a switched input $31_1$ and $31_2$. The switches $31_1$ and $31_2$, while shown as DPST switches, may be two-position waveguide transfer switches similar to $23_1$ and $23_2$. When both of amplifiers $22_1$ and $22_2$ are operational, the redundant amplifier 30 has no input, and its output is connected through the cascaded ports of the microwave switches $23_1$ and $23_2$ to a characteristic load impedance 32. If, for example, amplifier $22_1$ should fail, then switches $31_1$ and $23_1$ would be operated. This provides an input signal to the redundant amplifier 30, and the output of amplifier 30 is connected by way of waveguide switches $23_2$ and $23_1$ to the input port of the hybrid junction $25_1$. Meanwhile, the output of amplifier $22_1$ is connected by way of switch $23_1$ to the load impedance 32.

Each channel of each transmitting chain typically includes a baseband processor 33 receiving an input from the switch center and providing an output to a modulator and IF amplifier 34. The output of modulator and IF amplifier 34 is connected to an IF filter and equalizer 35 and thence to an upconverter 36. The output of upconverter 36 is connected to the input terminal of switch $31_1$, for example. The IF amplifiers and modulator/demodulator operate at a center frequency of 855 MHz to achieve broadband width (±250 MHz), avoid low order mixing products in the up and down converter and achieve efficient amplification and inexpensive channel filtering.

For reliable operation, it is necessary to isolate the transmission equipment from power transient as well as to continue operation during power interruptions. Therefore, prime power is taken from two lead-acid battery banks 37 and 38 which are constantly being recharged by chargers 39 and 40, respectively, from a commercial power line. Battery 37 contains a bank of 72 cells and supplies up to three power amplifier power supplies $41_1$ and $41_2$. Battery 38 contains 60 cells and powers an inverter 42 to operate all other equipment except building lighting, heating, and cooling. To further increase reliability of the prime power source, an engine/alternator and appropriate control circuitry can be provided to furnish power to the charges 39 and 40 in the event of prolonged commercial power source failure.

Monitoring and control of the reliable earth terminal according to the invention is accomplished both by means of local control and remote central control. Each station is intended to be monitored and controlled from a manned control center 43 serving a geographical region containing anywhere from 10 to 50 earth terminals. The control center would encompass an area limited in size so that a serviceman could travel by surface transportation to a terminal in eight hours or less. Alternatively, helicopter transportation could reduce this time or extend the area of coverage. Thus, for example, if a failure in high power amplifier $22_1$ occurs as earlier supposed, this would be detected at the central control 43 where the command to switch in the redundant high power amplifier 30 would be generated. A serviceman would then be dispatched to the earth terminal to either repair or replace the high power amplifier $22_1$. All of this would occur with no interruption in service.

In order to accomplish this, a transmitter monitor and control 44 is provided. Typically, the transmitter monitor and control 44 receives as inputs a pilot signal which is generated and transmitted through each transmitting chain, and signals proportional to the power in and the power out of each of the high power amplifiers $22_1$ and $22_2$. This monitored information is encoded and supplied to a local control device 45. In a like manner, each of the receiver chains is monitored to provide typically the detected pilot signal, out-of-band noise and automatic gain control signal information. Each of these inputs is encoded and supplied to the local control 45. The local control 45 additionally monitors the temperature and security sensors of the unattended earth terminal.

The local control 45 can take the form of either simple threshold circuits to determine what encoded information is to be transmitted to the central control 43 or may additionally include a limited capacity minicomputer programmed to generate control signals in response to the encoded monitored information supplied both directly to and from the transmitter and receiver monitor and control devices 44 and 46, respectively. Data information that is to be transmitted to the central control 43 is supplied to a data modem 47 which is connected either by satellite link or a land line to the central control 43. The central control 43 includes data modems $48_1$, $48_2$ and $48_3$ for each reliable earth terminal associated with that control center. The outputs of the data modems $48_1$, $48_2$ and $48_3$ are supplied as inputs to a central monitor and control processor 49. Processor 49 may simply provide visual readout on cathode ray tube display 50 and printer 51, for example, for monitoring by human operators, who, in response to the output displays, could generate appropriate control signals for the reliable earth terminals as required. On the other hand, the processor 49 might be programmed to provide the appropriate control signals directly without intervention of the human operators. In any case, control signals would be transmitted via the respective data modems $48_1$, $48_2$ and $48_3$ over the data link to the data modem 47 in the appropriate reliable earth terminal. These control signals could be supplied to the transmitter monitor and control 44, for example, which would convert the encoded control signals to analog signals. Such analog control signals would be used to typically control the power level of the high power amplifiers $22_1$ and $22_2$, to turn the driver of any one of the high power amplifiers on or off, or to switch in a redundant transmitter chain where required. Similarly, control signals could be supplied to the receiver monitor and control 46 which sould convert the encoded control signal to an analog control signal for switching in a redundant receiver chain where required. In addition to these controls, controls to position the antenna feed would be supplied to a feed positioner 52. Thus, the antenna feed could be positioned remotely to take account of satellite drift, or, if necessary, to redirect the antenna feed to a redundant satellite. Control and monitoring are arranged so that failure of the control system does not interupt any communications channel.

It will be apparent that the embodiment shown is only exemplary and that various modifications can be made in construction and arrangement within the scope of the invention as defined in the appended claims.

We claim:
1. In a satellite communications system comprising a network of central monitoring and central facilities and a plurality of unattended, reliable earth terminals connected by communication links to each central monitoring and control facility, each of said reliable earth terminals operating with two or more satellites in synchronous orbit above the earth and comprising:
   a. antenna means including a fixed reflector and a separate feed for each of said satellites,
   b. modular transmitter means connected to each of said separate antenna feeds and including a plurality of identical high power amplifiers equal in number to at least one more than the number of respective channels in the corresponding satellite but less than twice the number of channels, the bandwidth of each of said high power amplifiers being equal to or slightly greater than the total satellite communication bandwidth modular filter matrix means connected to a corresponding antenna feed and divided into a plurality of contiguous frequency bands equal in number to the number of respective satellite channels, and switch means for connecting a number of said plurality of high power amplifiers equal in number to the number of respective channels to said filter matrix means, the remaining high power amplifiers serving as spares and said switching means being operative to substitute one of said spares for any high power amplifier which fails,
   c. low-noise receiver means connected to each of said separate antenna feeds and including an uncooled parametric amplifier having a plurality of independent identical, interchangeable parametric amplifier modules connected in cascade by an integrated multi-port microwave circulator means whereby said modules can be removed and replaced without interruption to service, and
   d. monitor and control means connected to said modular transmitter means and said low-noise receiver means for monitoring and providing limited direct control of transmitting and receiving parameters, said monitor and control means also transmitting operating data of said reliable earth terminal over one of said communication links to its corresponding central monitoring and control facility.

2. A reliable earth terminal as recited in claim 1 wherein said terminal transmits and receives in two orthogonal polarizations to thereby double the maximum number of channels and said antenna means further includes polarizer and orthomode transducer means connected to each of said separate feeds for isolating orthogonally polarized transmit and receive signals.

3. A reliable earth terminal as recited in claim 1 wherein said monitor and control means receives antenna feed position command control signals from the central monitoring and control facility and said antenna means further comprises feed position means for each of said separate feeds and responsive to said command control signals for providing limited positioning of the separate feeds.

4. A reliable earth terminal as recited in claim 3 wherein said fixed reflector is a non-rectangular torus reflector.

5. A reliable earth terminal as recited in claim 1 wherein said low-noise receiver means further includes a parallel redundant transistor amplifier connected to the output of said uncooled parametric amplifier and filter-demultiplexer means connected to the output of said transistor amplifier for frequency demultiplexing signals amplified by said parametric and transistor amplifiers.

6. A reliable earth terminal as recited in claim 5 wherein said parallel redundant transistor amplifier includes first and second identical transistor amplifiers, an input four-terminal hybrid having one input port connected to the output of said parametric amplifier and the other input port terminated in its characteristic impedance and having the two output ports connected to the inputs of said first and second transistor amplifiers, and an output four-terminal hybrid having the two input ports connected to the outputs of said first and second transistor amplifiers and one output port connected to said filter-demultiplexer means and the other output port terminated in its characteristic impedance.

7. A reliable earth terminal as recited in claim 1 wherein said modular transmitter means additionally includes modulator, IF amplifier, upconvertor and local oscillator circuits for each channel and said receiver means additionally includes local oscillator, downconvertor, IF amplifier and demodulator circuits for each channel, each of said circuits being broadband, fixed tuned circuits which can be interchanged with like circuits and employing passive filter means or crystal means for channel assignment.

8. A reliable earth terminal as recited in claim 1 further comprising automatic gain control means in said receiver means for compensating for a loss in gain due to the failure of one or more of said parametric amplifier modules.

* * * * *

UNITED STATES PATENT AND TRADEMARK OFFICE
CERTIFICATE OF CORRECTION

PATENT NO. : 3,931,623

DATED : January 6, 1976

INVENTOR(S) : William K. SONES et al

It is certified that error appears in the above-identified patent and that said Letters Patent are hereby corrected as shown below:

IN THE SPECIFICATION:

Col. 4, Line 20, delete "biasupply", insert --bias supply--.

Line 62, delete "db", insert --dB--.

Col. 5, Line 24, delete "longlife", insert --long-life--.

Col. 7, Line 54, delete "should", insert --could--.

Signed and Sealed this

Nineteenth Day of April 1977

[SEAL]

Attest:

RUTH C. MASON
*Attesting Officer*

C. MARSHALL DANN
*Commissioner of Patents and Trademarks*